US011594828B2

(12) United States Patent
Gissler et al.

(10) Patent No.: US 11,594,828 B2
(45) Date of Patent: Feb. 28, 2023

(54) PRESSURE SEALED ELECTRICAL CONNECTION INTERFACE

(71) Applicant: Halliburton Energy Services, Inc., Houston, TX (US)

(72) Inventors: Robert William Gissler, Spring, TX (US); Stacey Michelle Joiner, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 17/306,933

(22) Filed: May 3, 2021

(65) Prior Publication Data
US 2022/0352654 A1 Nov. 3, 2022

(51) Int. Cl.
*H01R 4/70* (2006.01)
*H02G 15/18* (2006.01)
*H01R 4/28* (2006.01)

(52) U.S. Cl.
CPC .............. *H01R 4/70* (2013.01); *H01R 4/28* (2013.01); *H02G 15/18* (2013.01)

(58) Field of Classification Search
CPC . H01R 4/28; H01R 4/70; H01R 4/164; H01R 9/038; H01R 9/031; H01R 9/0512; H01R 13/523; H01R 43/005; H02G 1/14; H02G 15/18; E21B 17/028; E21B 17/003; E21B 17/20; E21B 33/04; E21B 33/10; E21B 43/128
USPC ............ 174/74 R, 78, 77 R, 84 R; 166/65 R, 166/75 A, 75 R, 85
See application file for complete search history.

(56) References Cited

U.S. PATENT DOCUMENTS

| 4,708,201 A * | 11/1987 | Reed ..................... H01R 13/523 439/191 |
| 5,377,747 A * | 1/1995 | Didier .................. H01R 13/523 439/604 |
| 6,681,861 B2 | 1/2004 | Davidson et al. |
| 6,910,910 B2 | 6/2005 | Cairns |

(Continued)

FOREIGN PATENT DOCUMENTS

WO 2017213726 A2 12/2017

OTHER PUBLICATIONS

PCT Application No. PCT/US2021/030592, International Search Report, dated Jan. 10, 2022, 4 pages.

(Continued)

*Primary Examiner* — William H. Mayo, III
(74) *Attorney, Agent, or Firm* — DeLizio, Peacock, Lewin & Guerra

(57) ABSTRACT

Components and systems include devices for implementing downhole splice connections within a wellbore. In some embodiments, a downhole splice connector includes at least one connector body having an inner diameter defining a cavity within which at least one connector receptacle is disposed, and at least one conductive center pin disposed within the at least one connector receptacle. The downhole splice connector further includes at least one pressure sleeve annularly disposed between an inner diameter of the connector body and an outer diameter of the center pin, such that a pressure barrier is formed between an outer diameter of the pressure sleeve and an inner diameter of the connector body and a pressure barrier is formed between an inner diameter of the pressure sleeve and an outer diameter of the center pin.

20 Claims, 4 Drawing Sheets

(56) References Cited

U.S. PATENT DOCUMENTS

| | | | |
|---|---|---|---|
| 7,364,451 B2 | 4/2008 | Ring et al. | |
| 10,443,317 B2* | 10/2019 | O'Grady | E21B 17/003 |
| 2013/0236332 A1 | 9/2013 | Frey et al. | |
| 2014/0335712 A1* | 11/2014 | Semple | E21B 43/128 |
| | | | 439/271 |
| 2014/0370735 A1* | 12/2014 | Nicholson | H01R 13/523 |
| | | | 439/271 |
| 2017/0350198 A1* | 12/2017 | Ma | E21B 17/00 |
| 2020/0335899 A1 | 10/2020 | Lerner et al. | |
| 2021/0095529 A1* | 4/2021 | Gissler | H01R 13/111 |

OTHER PUBLICATIONS

PCT Application No. PCT/US2021/030592, Written Opinion of the International Searching Authority, dated Jan. 10, 2022, 5 pages.

* cited by examiner

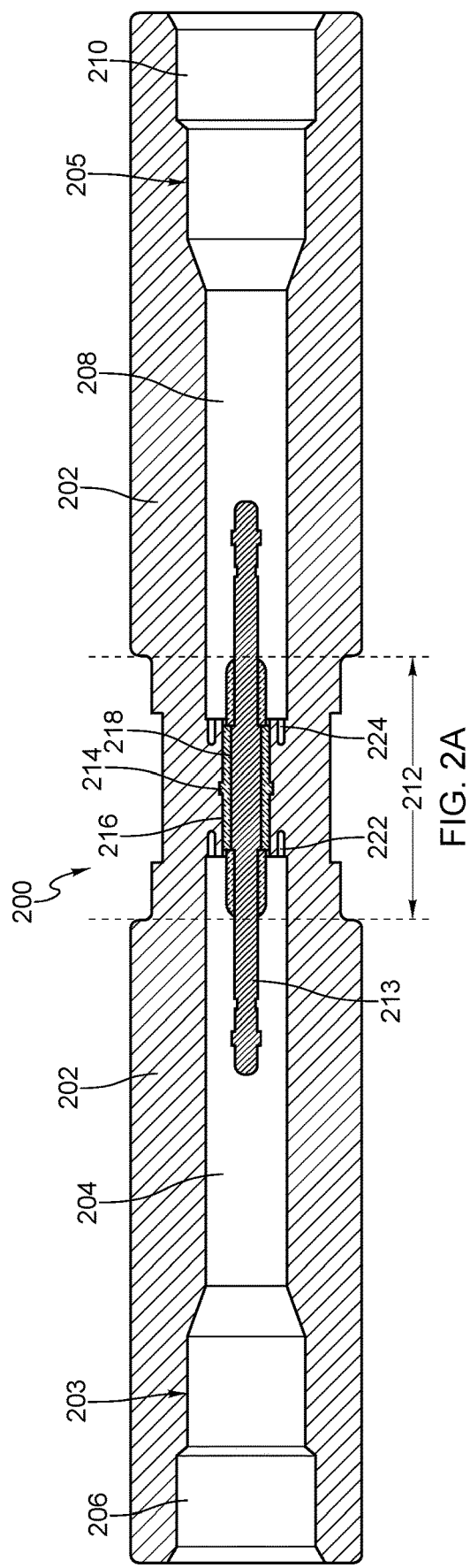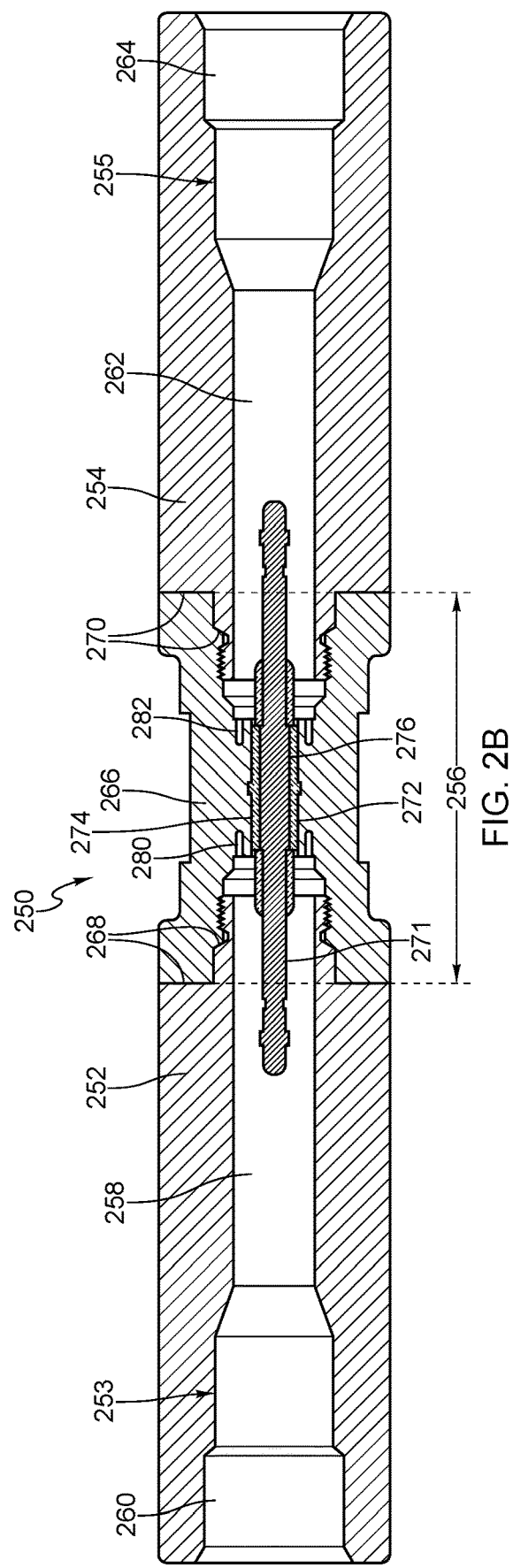

PRESSURE SEALED ELECTRICAL CONNECTION INTERFACE

TECHNICAL FIELD

The disclosure generally relates to the field of pressure sealed electrical interfaces and connections and to electrical connectors for use in high ambient pressure environments such as wellbore and deep-sea environments.

BACKGROUND

The oil and gas industry utilizes downhole systems and devices that require electrical power to perform their intended functions. Depending on the function and system locations, pressure barriers are required such as between downhole compartments to protect internal systems and components from the considerable hydrostatic pressures experienced at depth. Downhole pressure barriers include pressure sealed bulkheads that isolate various compartments that contain environmentally sensitive equipment such as electrical and electronic equipment. A downhole supply cable with multiple interfaces to several additional downhole electrical conductors and connection interfaces are utilized to supply power to the typically numerous downhole electrical loads. Sealed conduits between pressure sealed compartments are therefore required to supply power to the electrical and electronic equipment disposed in different sealed compartments along a drill string, completion string, and/or production string. For example, a sealed connector may be installed in a compartment pressure barrier such as compartment bulkhead. The bulkhead connector is typically installed in a hole profile machined in a part that houses the connector. A potential leak path between the connector and the mating part is normally sealed off by using an elastomeric seal, a thermoplastic seal, a metal-to-metal seal, or a weld joint.

The reliability of the bulkhead connector may be substantially increased if the potential for a leak path such as internal or external to the connector is minimized. Preventing internal and external electrical connector fluid leaks becomes more difficult as the depth and corresponding hydrostatic pressure increases within a wellbore. Other ambient environmental conditions such as temperature may also adversely affect fluid leak prevention due to changes in material properties of sealing devices such as elastomeric or plastic gaskets, rings, and other types of sealing components. Such environmental conditions may also affect metal-to-metal contact or weld seals due to expansion/contraction at any given instant as well as due to metal fatigue over many expansion/contraction cycles.

BRIEF DESCRIPTION OF THE DRAWINGS

Embodiments of the disclosure may be better understood by referencing the accompanying drawings.

FIG. 2A is a cross-section diagram illustrating an electrical splice connector having an integrated external housing in accordance with some embodiments;

FIG. 2B is a partial cross-section and partial cutaway diagram illustrating an electrical splice connector in accordance with some embodiments;

DESCRIPTION OF EMBODIMENTS

Figure 1:
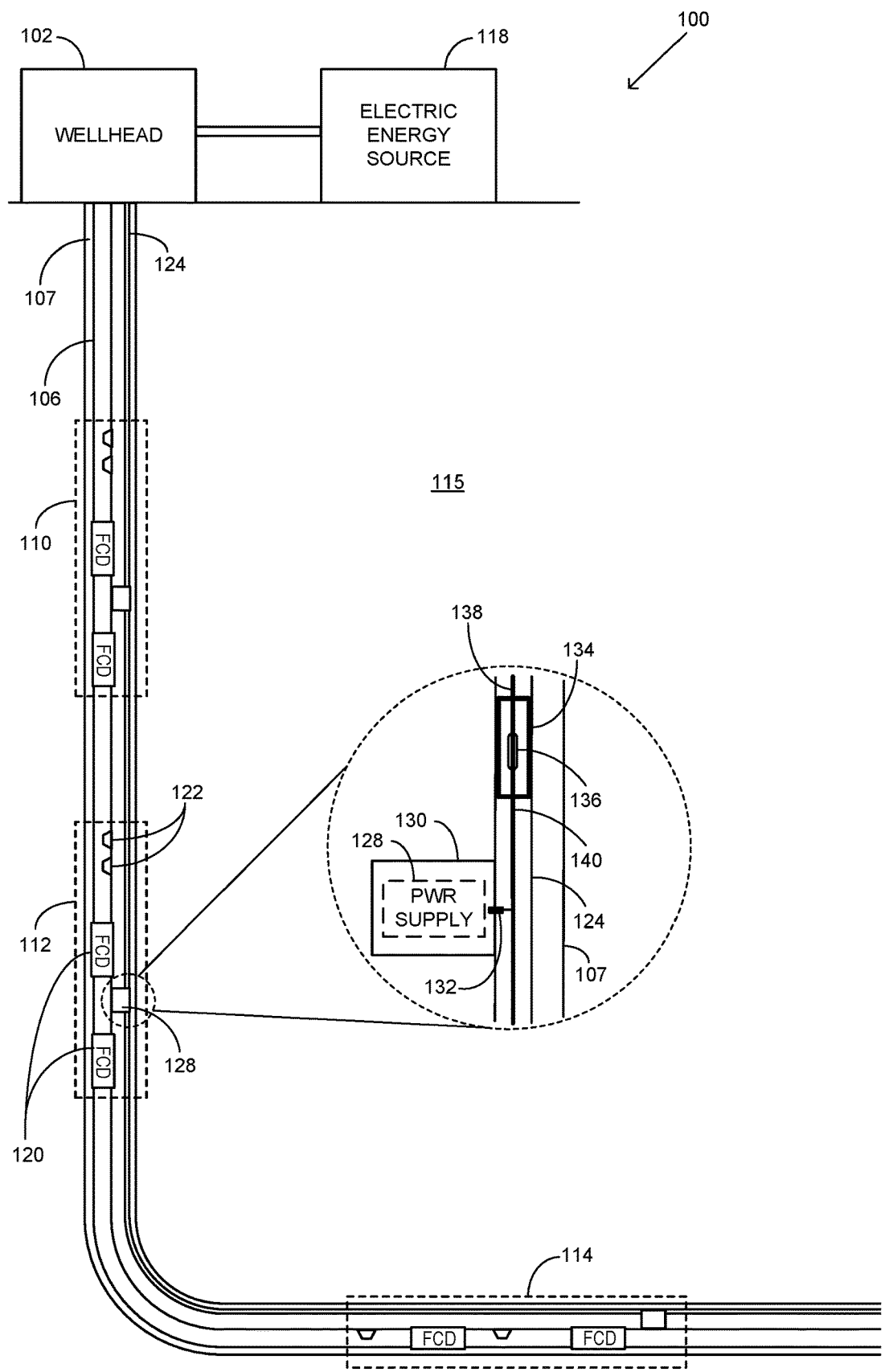
FIG. 1 is a high-level system diagram depicting a well system having a downhole electrical distribution network including one or more pressure sealed connectors configured in accordance with some embodiments.

The description that follows includes example systems, methods, techniques, and program flows that embody aspects of the disclosure. However, it is understood that this disclosure may be practiced without one or more of these specific details. Well-known instruction instances, protocols, structures, and techniques have not been shown in detail in order not to obfuscate the description.

Overview

Disclosed embodiments include electrical connectors configured to mechanically and electrically connect downhole systems and components such as may be separated by pressure barriers that may or may not encompass the electric connectors. The electrical connectors may be installed, for example, in a downhole pressure sealed bulkhead to enable an electrical power or signal line to pass through the bulkhead between compartments subject to potentially different fluid pressures and/or other environmental conditions. In some embodiments, an electrical connector may be configured as an integral, single body unit in which both ends of a splice interface are housed. The single body structure (e.g., integrated molded body) prevents external fluid pressure from penetrating into the splice connection, which may further comprise a glass ceramic sleeve forming a pair of glass-to-metal joints that prevents fluid pressure from penetrating across the splice connection. As utilized herein, a glass ceramic sleeve may comprise a glass or ceramic material or a combination of both.

In some embodiments, an electrical connector may be configured as a dry-mate connector assembly including an outer body housing and internal pressure barrier components that protect an internal releasable connection interface from fluid pressures external to and potentially internal to a supply cable to which the connector is coupled or otherwise integrated. The pressure seal components may be configured to simultaneously facilitate electrical connectivity to maximize conductivity and connection reliability across the connector. The dry-mate splice connector may be configured for either or both cable-to-cable splices and cable-to-component electrical connections such as a cable head connection between a downhole power supply cable and one or more downhole electrical and electronic devices.

The disclosed splice connectors may be implemented as a bulkhead connector having a conductor contact interface coupled between a pair of opposing mating ends and in which at least one mating end may be disconnected from the bulkhead connector. In one aspect, a splice connector comprises a three-part body connector in which a middle sleeve is welded or otherwise coupled to an opposing pair of connector bodies having internal receptable cavities. The internal receptacle cavities are configured to contain connector receptacles configured to protectively house respective center pins forming each end of the splice. At least a portion of a splice interface is formed within the cylindrical inner diameter (ID) of the middle sleeve. In some embodiments, the splice interface includes the middle sleeve and one or more internal fluid pressure barriers disposed within the ID of the middle sleeve. For example, the spice interface may include ceramic glass sleeves disposed around an outer diameter (OD) of the center pins of each connector end and within the ID of respective axial extents of the connector ends. In this annular disposition, a pair of cylindrical fluid pressure barriers are formed as glass-to-metal joints between the IDs of ceramic glass sleeves and the ODs of the center pins and the ODs of the ceramic glass sleeves and the IDs of axial extents of the connector bodies.

Example Illustrations

FIG. 1 is a high-level block diagram depicting a well system 100 having a downhole electrical distribution network that implements an electrical connection interface apparatus including one or more pressure sealed connectors in accordance with some embodiments. Well system 100 generally includes a wellhead 102 that is a surface termination of a wellbore 107 that has been formed such as by drilling within subterranean strata 115. Wellhead 102 includes systems and components configured to implement completion and/or production operations. For embodiments in which well system 100 is configured for completion operations, wellhead 102 may include systems and components configured to install casing during production well construction. Wellhead 102 may also include systems and components configured to install production infrastructure such as production tubing that is intercoupled and installed downhole within wellbore 107 to form a production string 106. During production operations, tubing within production string 106 forms the primary flow conduit through which downhole fluids, such as hydrocarbon fluids, flow from formation(s) within subterranean strata 115 to the surface through wellhead 102. Whether to facilitate production operations and/or completion operations, well system 100 includes electronic and electrical systems and components that are deployed downhole within wellbore 107.

The depicted electronic and electrical systems and components within well system 100 may include several flow control devices such pumps, valves, nozzles, actuators, as well as other devices that are electrically actuated and operated. In addition to higher power consuming devices such as downhole pumps and valves, well system 100 may include a number of lower power downhole electrical devices such as downhole measurement instruments, such as permanent downhole gauges (PDGs), accelerometers, resistivity, gamma or neutron, density, or other measurement or monitoring devices. To efficiently supply power to the different and spatially separated loads, well system 100 is configured to provide semi-independent power supply to designated power distribution zones that includes respective sets of loads and local power supplies. To this end, well system 100 includes distribution zones 110, 112, and 114.

Each of power distribution zones 110, 112, and 114 includes multiple electrically powered systems and components (loads) and may further include one or more local, in situ power supplies such as voltage regulators/converters. For instance, distribution zone 112 includes loads configured as flow control devices 120 and permanent downhole gauges 122. Distribution zone 112 further includes a local power supply 128 that provides power to loads within the zone.

For ease and clarity of illustration and description, only a limited number of electrical and electronic downhole devices are expressly depicted in FIG. 1. Typically, well system 100 includes many downhole electric and electronic components that each become active electrical loads when activated during downhole completion/production operations. To supply the requisite voltage and current levels, well system 100 includes a source power supply that includes an electric energy source 118 and a power supply cable implemented as a tubing encapsulated conductor (TEC) cable 124. TEC cable 124 comprises a center conductor such as a solid or stranded copper conductor encased within one or more metallic shield and insulating layers. TEC cable 124 is designed and installed as a permanent or semi-permanent downhole cable to supply power via cable connector heads to downhole systems and components such as distribution zones 110, 112, and 114. In the depicted embodiment, electrical energy source 118 is a surface system such as a generator system comprising a set of generator trucks fluid driven turbines, and/or solar photoelectric generators positioned in proximity to the site of wellhead 102. Electrical energy source 118 may also or alternatively include a powerline electrical source such as a powerline connection or interface. The electrical power sourced and output from electrical energy source 118 may be any combination of DC and/or alternating current (AC) power.

The downhole electrical supply for well system 100 may include several downhole power supply units including downhole power supply unit 128 within distribution zone 112 and similar supplies within distribution zones 110 and 114. In the depicted embodiment, power is supplied to the downhole loads at the requisite voltage/current levels from TEC cable 122 via the local supply units that may be configured as voltage regulators including voltage converters. The variety of different types of electrically powered downhole loads have different power consumption requirements and are located at widely varying locations along wellbore 107.

Electric power distribution from the surface to downhole loads such as within distribution zones 110, 112, and 114 requires electrical connections such as splice connections that connect a variety of different electrical and/or signal lines. The connections may be implemented as and/or referred to in a variety of ways such as electric coupling, connection, splice connection/connector, etc. Electrical connections such as splice connections between electric/signal lines may be utilized to provide electrical connectivity between different regions or compartments within wellbore 107 between which there may be environmental and/or designed discontinuities in operating conditions such as pressure and temperature. For example, different operating regions such as the depicted distribution zones 110, 112, and 114 and or electric components within the zones may be mutually pressure isolated such as via compartment barrier walls.

The electrical connections between such otherwise mutually isolated zones or components may require a level of external isolation from external environmental conditions such as potentially extreme hydrostatic fluid pressures. In the depicted embodiment, TEC cable 124 may include a pressure tube forming an outer protective layer that serves to prevent migration of external fluids within wellbore 107 into its internal structure. Similarly, and in accordance with the embodiments depicted herein, electrical splice connections may be optimized by including a secondary fluid pressure barrier that prevents external fluid pressure that may be very high on one or both sides of the connection from breaching into the internal electrical connection interface (i.e., splice interface). The disclosed embodiments also include arrangements of components and features to reduce or eliminate internal migration of potentially high-pressure fluid along the internal structure of an electrical line or cable. For example, TEC cable 124 may be breached, possibly at a connector interface, and the resultant pressurized fluid may travel upward along the cable through one or more connection interfaces without adequate internal fluid pressure barriers within the interfaces.

Source electric power is received by the respective local power supplies from TEC cable 124 and transmitted to various downhole location such as within distribution zones 110, 112, and 114. Delivery of power along TEC cable 124 and from TEC cable 124 to local power supplies may require splice connections such as depicted proximate to power supply unit 128. Supply power is transmitted along a conductor line within TEC cable 124, which as shown may be splice connected via a splice connector 134 from an upstream conductor line 138 to a downstream conductor line 140. As further shown, a splice connector 132 is configured to electrically and mechanically couple the supply from TEC cable 124 to power supply 128, which is disposed in a power supply housing 130. As depicted and described in further detail with reference to FIGS. 2A, 2B, 3A, 3B, 4A, and 4B, splice connectors 132 and 134 include components including a splice interface, such as splice interface 136, arranged and configured to prevent ingress of external fluids at pressure. The splice connectors further include components arranged and configured to prevent fluid pressure from breaching across internally from one side of the connector to the other.

FIG. 2A is a cross-section diagram illustrating an electrical splice connector 200 having an integrated external housing in accordance with some embodiments. As shown, splice connector 200 includes a singular integrated connector body 202 that houses the other components including splice interface components. Connector body 202 may be fabricated as a single machined/molded unit from one or more materials having sufficient strength and corrosion resistance that balances rigidity and flexibility. For example, connector body 202 may comprise a steel alloy having material properties including rigidity to provide a sufficient resistance to internal collapse from potentially high external fluid pressures in potentially high temperature downhole locations. The structural design of connector body 202 as a singular integrated unit with no welded or otherwise mechanically coupled seams presents an optimal pressure barrier against external, high pressure fluids from entering the internal structure of splice connector 200.

The internal structure of splice connector 200 is disposed within a cavity defined by the internal diameter (ID) of connector body 202. The internal structure includes a symmetric arrangement of internal conductors and spice interface components configured to electrically couple line conductors. In the depicted embodiment, the internal structure includes a pair of connector receptacles 203 and 205 disposed at each opposing end of splice connector 200. Connector receptacle 203 includes a receptacle sleeve 204 configured to contain and protect a conductor line (not expressly depicted) that is to be splice connected. Connector receptacle 203 further includes an end coupler 206 configured to mechanically fasten to a corresponding coupling for the line conductor. Similarly, the opposing connector receptacle 205 includes a receptacle sleeve 208 and end connector 210 that are configured to receive, contain, and attach to another conductor line to be splice connected.

Splice connector 200 further includes a splice interface 212 configured to electrically connect the two line conductors contained in connector receptacles 203 and 205. Splice interface 212 comprises a conductive center pin 213 that extends axially between and centered within receptacle sleeves 204 and 208. Center pin 213 may comprise a highly conductive and sufficiently rigid metallic material such as copper or a copper alloy, stainless steel or nickel alloy, or other corrosion resistant alloy for example. Each of the ends of center pin 213 is connected to one of the two conductor lines to be splice connected within splice interface 212.

Splice interface 212 comprises concentrically arranged components such as a center extent of connector body 202 disposed around a center extent of center pin 213. Splice interface 212 further includes components arranged and configured to prevent pressurized fluid from migrating in either direction between connector receptacles 203 and 205 across splice interface 212. To this end, splice interface 212 includes a pressure sleeve 214 annularly disposed between an ID of the center portion connector body 202 and an outer diameter (OD) of center pin 213. The inner and outer contour of pressure sleeve 214 substantially match the contour of the opposing surfaces of connector body 202 and center pin 213 to provide maximum contact joints. To further increase fluid pressure resistance, pressure sleeve 214 may be fabricated of a material that is micro-amorphous but substantially macro-rigid such as glass. In some embodiments, pressure sleeve 214 may comprise a polycrystalline material having crystalline regions and amorphous regions such as a ceramic glass.

The annular disposition of pressure sleeve 214 between center pin 213 and connector body 202 results in a pair of elongated, cylindrical pressure barriers configured as glass-to-metal joints. Namely, a first pressure barrier 216 is formed as a glass-to-metal joint between the OD of pressure sleeve 214 and the ID of a portion of connector body 202, and a second pressure barrier 218 is formed as a glass-to-metal joint between the ID of pressure sleeve 214 and the OD of a portion of center pin 213. Pressure barriers 216 and 218 provide substantial resistance to fluid penetration between the ends of the internal structure of splice connector 200.

To enhance the fluid penetration resistance, splice connector 200 further includes cylindrical grooves within connector body 202 that provide a more fail-safe design in case one side of the splice connector is breached by high pressure fluid. For instance, connector body 202 includes a cylindrical groove 222 disposed around the end of pressure sleeve 214 proximate the inner axial end of receptacle sleeve 204. Consistent with the bilaterally symmetric configuration, connector body 202 further includes a cylindrical groove 224 disposed around the end of pressure sleeve 214 proximate the inner axial end of receptacle sleeve 204. Grooves 222 and 224 may be empty cylindrical cavity spaces extending from the ends of receptacle sleeves 204 and 208 respectively or may contain a flanged extension from the ends of receptacle sleeves. In either case, if pressurized fluid migrates into one side of splice connector 200, the one of grooves 222 and 224 on that side is configured to apply additional pressure on the corresponding end of pressure sleeve 214 to prevent fluid from migrating across to the other connector end. For instance, pressurized fluid that migrates into connector receptacle 203 or other components on that side of the internal structure of splice connector 200, will flow into groove 222 and apply a radial inward force on the narrow band of body material between groove 222 and pressure sleeve 214. The connector body material has sufficient flexibility given the narrow contour to translate the inward radial pressure to the glass-to-metal joint between the ID of connector body 202 and the OD of pressure seal 214.

Embodiments may further include splice connectors having multi-part body design. FIG. 2B is a partial cross-section and partial cutaway diagram illustrating an electrical splice connector 250 having a three-part external body design in accordance with some embodiments. Splice connector 250 includes an external connector structure comprising a first connector body 252 and a second connector body 254 that each house components including splice interface components for a respective pin connector. The external structure of splice connector 250 further includes a middle sleeve 266 axially disposed between connector bodies 252 and 254. Connector bodies 252 and 254 and middle sleeve 266 may be fabricated as discrete units from one or more materials having sufficient strength and corrosion resistance that balances rigidity and flexibility. For example, connector bodies 252 and 254 and middle sleeve 266 may comprise a steel alloy having material properties including rigidity to provide a sufficient resistance to internal collapse from potentially high external fluid pressures in potentially high temperature downhole locations. Connector bodies 252 and 254 and middle sleeve 266 may be mechanically and materially coupled such as by weld joints 268 and 270 that present substantially fluid resistance seams that provide a pressure barrier against external, high pressure fluids from entering the internal structure of splice connector 250. In some embodiments, middle sleeve 266 may be coupled to connector bodies 252 and 254 by Additive Manufacturing (3D printing). This process may include directed energy deposition such as Direct Metal Laser Sintering, Direct Metal Laser Melting or Electron Beam Melting.

The internal structure of splice connector 250 is disposed within respective internal cavities defined by the IDs of connector bodies 252 and 254. The internal structure includes a symmetric arrangement of internal conductors and spice interface components configured to electrically couple line conductors. The internal structure includes a pair of connector receptacles 253 and 255 disposed at each opposing end of splice connector 250. Connector receptacle 253 includes a receptacle sleeve 258 configured to contain and protect a conductor line (not expressly depicted) that is to be splice connected. Connector receptacle 253 further includes an end coupler 260 configured to mechanically fasten to a corresponding coupling for the line conductor. Similarly, the opposing connector receptacle 255 includes a receptacle sleeve 262 and an end connector 264 that are configured to receive, contain, and attach to another conductor line to be splice connected.

Splice connector 250 further includes a splice interface 256 configured to electrically connect the two line conductors contained in connector receptacles 253 and 255. Splice interface 256 comprises a conductive center pin 271 that extends axially between and centered within receptacle sleeves 258 and 262. Center pin 271 may comprise a highly conductive and sufficiently rigid metallic material such as copper or a copper alloy, stainless steel or nickel alloy, or other corrosion resistant alloy for example. Each of the ends of center pin 271 is connected to one of the two conductor lines to be splice connected within splice interface 256.

Splice interface 256 comprises concentrically arranged components including middle sleeve 266 disposed around a center extent of center pin 271. Splice interface 256 further includes components arranged and configured to prevent pressurized fluid from migrating in either direction between connector receptacles 253 and 255 across splice interface 256. To this end, splice interface 256 includes a pressure sleeve 272 annularly disposed between an ID of middle sleeve 266 and an OD of center pin 271. The inner and outer contour of pressure sleeve 272 substantially match the contour of the opposing surfaces of middle sleeve 266 and center pin 271 to provide maximum contact joints. To further increase fluid pressure resistance, pressure sleeve 272 may be fabricated of a material that is micro-amorphous but substantially macro-rigid such as glass. In some embodiments, pressure sleeve 272 may comprise a polycrystalline material having crystalline regions and amorphous regions such as a ceramic glass.

The annular disposition of pressure sleeve 272 between center pin 271 and middle sleeve 266 results in a pair of elongated, cylindrical pressure barriers configured as glass-to-metal joints. Namely, a first pressure barrier 274 is formed as a glass-to-metal joint between the OD of pressure sleeve 272 and the ID of middle sleeve 266, and a second pressure barrier 276 is formed as a glass-to-metal joint between the ID of pressure sleeve 272 and the OD of a portion of center pin 271. Pressure barriers 274 and 276 provide substantial resistance to fluid penetration between the ends of the internal structure of splice connector 250. Similar to splice connector 200, splice connector 250 further includes cylindrical grooves 280 and 282 within connector bodies 252 and 254 that provide a more fail-safe design in case one side of the splice connector is breached by high pressure fluid.

Figure 3A:
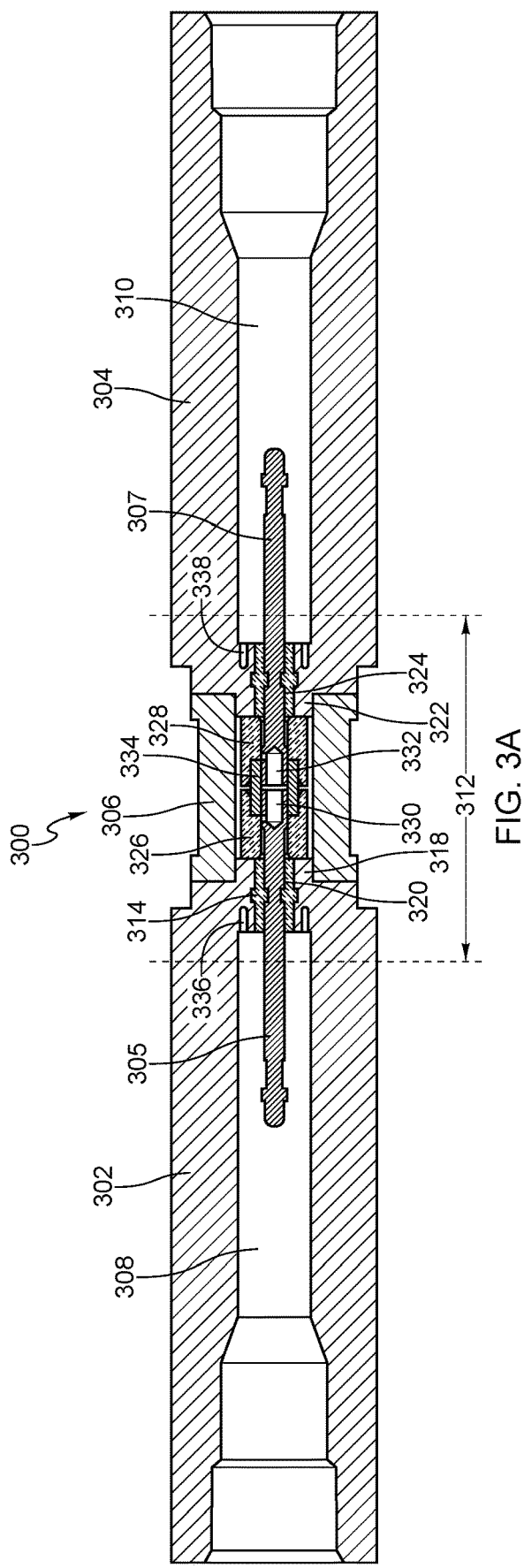
FIG. 3A is a partial cross-section and partial cutaway diagram depicting an electrical splice connector in accordance with some embodiments.

The embodiment depicted in FIG. 2A provides a no-seam external pressure barrier and a single pressure sleeve barrier between the ends of the splice connector. The embodiment depicted in FIG. 2B provides a welded seam external pressure barrier and, as with the embodiment in FIG. 2A, provides a single pressure sleeve barrier between the ends of the splice connector. FIG. 3A is a partial cross-section and partial cutaway diagram depicting an electrical splice connector 300 that includes a multi-part external body and multiple internal pressure sleeve barriers in accordance with some embodiments. Splice connector 300 includes an external connector structure comprising a first connector body 302 and a second connector body 304 that each house components including splice interface components for a respective pin connector. The external structure of splice connector 300 further includes a middle sleeve 306 axially disposed between connector bodies 302 and 304. Connector bodies 302 and 304 and middle sleeve 306 may be fabricated as discrete units from one or more materials having sufficient strength and corrosion resistance that balances rigidity and flexibility. For example, connector bodies 302 and 304 and middle sleeve 306 may comprise a steel alloy having material properties including rigidity to provide a sufficient resistance to internal collapse from potentially high external fluid pressures in potentially high temperature downhole locations. Connector bodies 302 and 304 and middle sleeve 306 may be mechanically and materially coupled such as by weld joints that present substantially fluid resistance seams that provide a pressure barrier against external, high pressure fluids from entering the internal structure of splice connector 300.

The internal structure of splice connector 300 is disposed within respective internal cavities defined by the IDs of connector bodies 302 and 304. The internal structure includes a symmetric arrangement of internal conductors and spice interface components configured to electrically couple line conductors. The internal structure includes a pair of connector receptacles 308 and 310 disposed at each opposing end of splice connector 300. Splice connector 300 further includes a splice interface 312 configured to electrically connect the two line conductors contained in connector receptacles 308 and 310. In contrast to the embodiments depicted in FIGS. 2A and 2B, splice interface 312 is configured as two distinct pin connectors having respective center pins. The first pin connector includes a conductive center pin 305 that is disposed within and extends axially from connector receptacle 308. The second pin connector includes a conductive center pin 307 that is disposed within and extends axially from connector receptacle 310. Center pins 305 and 307 may comprise a highly conductive and sufficiently rigid metallic material such as copper or a copper alloy, for example.

Splice interface 312 comprises concentrically arranged components including middle sleeve 306 disposed around the opposing ends of center pins 305 and 307 including male pin terminals 330 and 332. Splice interface 312 further includes components arranged and configured to prevent pressurized fluid from migrating in either direction between connector receptacles 308 and 310. To this end, splice interface 312 includes a pair of pressure sleeves 314 and 316 that are included in the respect pin connectors. Pressure sleeve 314 is annularly disposed between an ID of an extent of connector body 302 and an OD of center pin 305. Pressure sleeve 316 is annularly disposed between an ID of an extent of connector body 304 and an OD of center pin 307. The inner and outer contours of pressure sleeves 314 and 316 substantially match the contour of the opposing surfaces of connector bodies 302 and 304 and center pins 305 and 307 to provide maximum contact joints. To further increase fluid pressure resistance, pressure sleeves 314 and 316 may be fabricated of a material that is micro-amorphous but substantially macro-rigid such as glass. In some embodiments, pressure sleeves 314 and 316 may comprise a polycrystalline material having crystalline regions and amorphous regions such as a ceramic glass.

The annular disposition of pressure sleeves 314 and 316 between center pins 305 and 307 and connector bodies 302 and 304 results in two pairs of elongated, cylindrical pressure barriers that may be configured as glass-to-metal joints or joints comprises of a different material or combination of materials providing a sufficient fluid pressure barrier. One pair of pressure barriers includes a first pressure barrier 318 that is formed as a glass-to-metal joint between the OD of pressure sleeve 314 and the ID of connector body 302, and a second pressure barrier 320 that is formed as a glass-to-metal joint between the ID of pressure sleeve 314 and the OD of a portion of center pin 305. The other pair of pressure barriers includes a first pressure barrier 322 that is formed as a glass-to-metal joint between the OD of pressure sleeve 316 and the ID of connector body 304, and a second pressure barrier 324 that is formed as a glass-to-metal joint between the ID of pressure sleeve 316 and the OD of a portion of center pin 307. Pressure barriers 318, 320, 322, and 324 provide substantial resistance to fluid penetration between the ends of the internal structure of splice connector 300. Similar to splice connectors 200 and 250, splice connector 300 further includes cylindrical grooves 336 and 338 within connector bodies 302 and 304 that provide a more fail-safe design in case one side of the splice connector is breached by high pressure fluid.

Splice interface 312 further includes components configured to strengthen the mechanical connection and consequently the electrical conduction path between center pins 305 and 307. To this end, splice interface 312 further includes a shrink ring 334 that is annularly disposed between a pair of shrink ring collars 326 and 328 and the opposing pair of pin terminals 330 and 332. Shrink ring 334 may be activated by heating, causing shrink ring 334 to compress radially inward and secure the connection of the opposing pin connectors. Shrink ring 334 may be fabricated of a metallic conductive material providing a current path between the ODs of each of center pins 305 and 307 with which the ID of shrink ring is compressed into contact.

The opposing dual pressure sleeve design of splice connector 300 is further configured to enhance the fluid pressure resistance if one of pressure sleeves 314 or 316 is breached by internal fluid pressure. For instance, if pressure sleeve 314 is breached, the fluid pressure migrates within the ID of middle sleeve 306 such as through the contact seam between shrink ring collars 326 and 328 and the ID surface of middle sleeve 306. The fluid pressure is exerted radially inward on the narrowed inner collar of connector body 304, which translates and applies the pressure radially inward on pressure sleeve 316 to enhance the glass-to-metal joints 322 and 324.

In addition to the depicted pressure sleeves, splice interface 312 may further include adhesive sealant material such as an electrically non-conductive epoxy or similar material applied within one or more of the internal cavities within splice interface 312. For example, the adhesive sealant material may be applied to spaces around the outer surfaces of shrink ring collars 326 and 328 to pressure seal the space between shrink ring collars 326 and 328 and middle sleeve 306. The adhesive sealant may also be applied to the annular space around pressure sleeves 314 and 316 and to spaces between the inner surfaces of shrink ring collars 326 and 328 and the opposing outer surfaces of shrink ring 334. Applied in any of the spaces within splice interface 312, the adhesive sealant material provides additional mechanical support and forms a fluid pressure barrier that prevents internal fluid migration from reaching the inner conductor pins in case of a leak around middle sleeve 306.

Figure 3B:
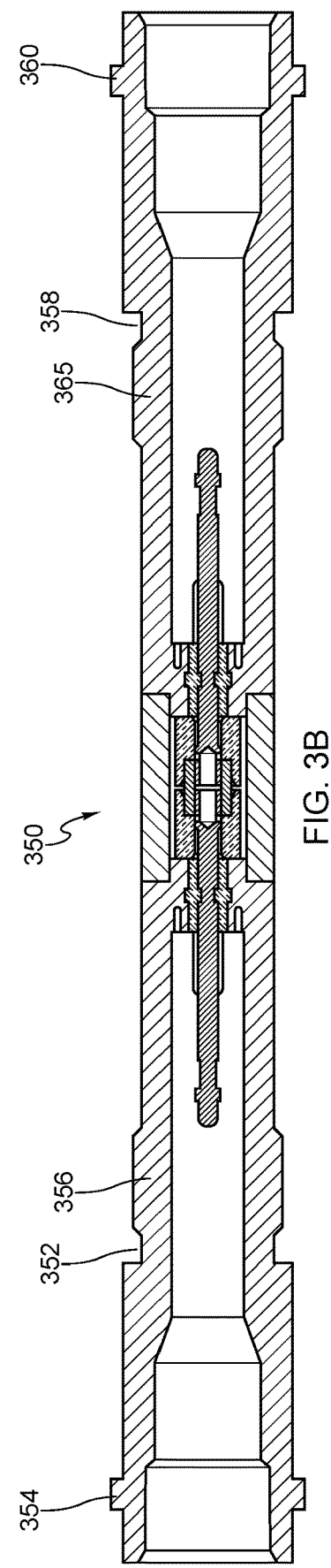
FIG. 3B is a partial cross-section and partial cutaway diagram illustrating an electrical splice connector in accordance with some embodiments.

Similar to splice connectors 200 and 250, splice connector 300 has an external body contour in which the center external profile that surrounds splice interface 312 has a machined OD profile that conforms to an ID profile of a bulkhead (not depicted) in which splice connector may be installed. FIG. 3B is a partial cross-section and partial cutaway diagram illustrating an electrical splice connector 350 in accordance with some embodiments. As shown, splice connector 350 includes many of the same components including a similarly configured splice interface 312. As shown, the OD profile includes various machined contours such as a seal groove 352 and a weld flange 354 on a connector body 356 and a seal groove 358 and a weld flange 360 on a connector body 362. Such variations on the OD of the external connector bodies permits installation of splice connectors in a variety of different configurations.

Figure 4A:
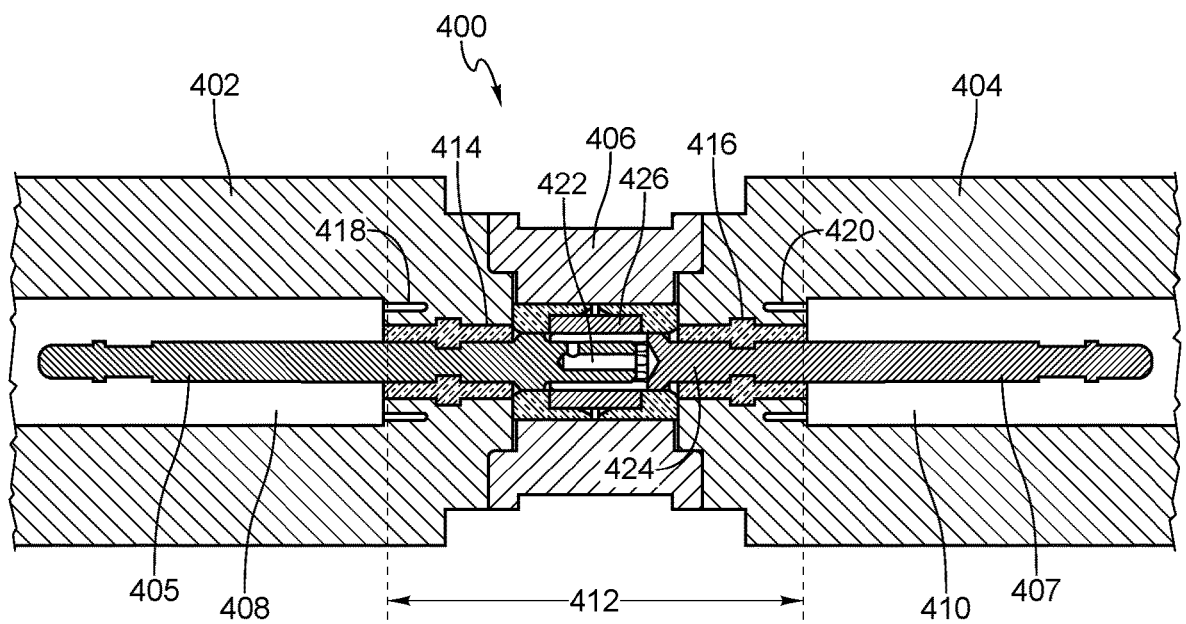
FIGS. 4A and 4B are partial cross-section and partial cutaway diagrams depicting an electrical splice connector in accordance with some embodiments.
Figure 4B:
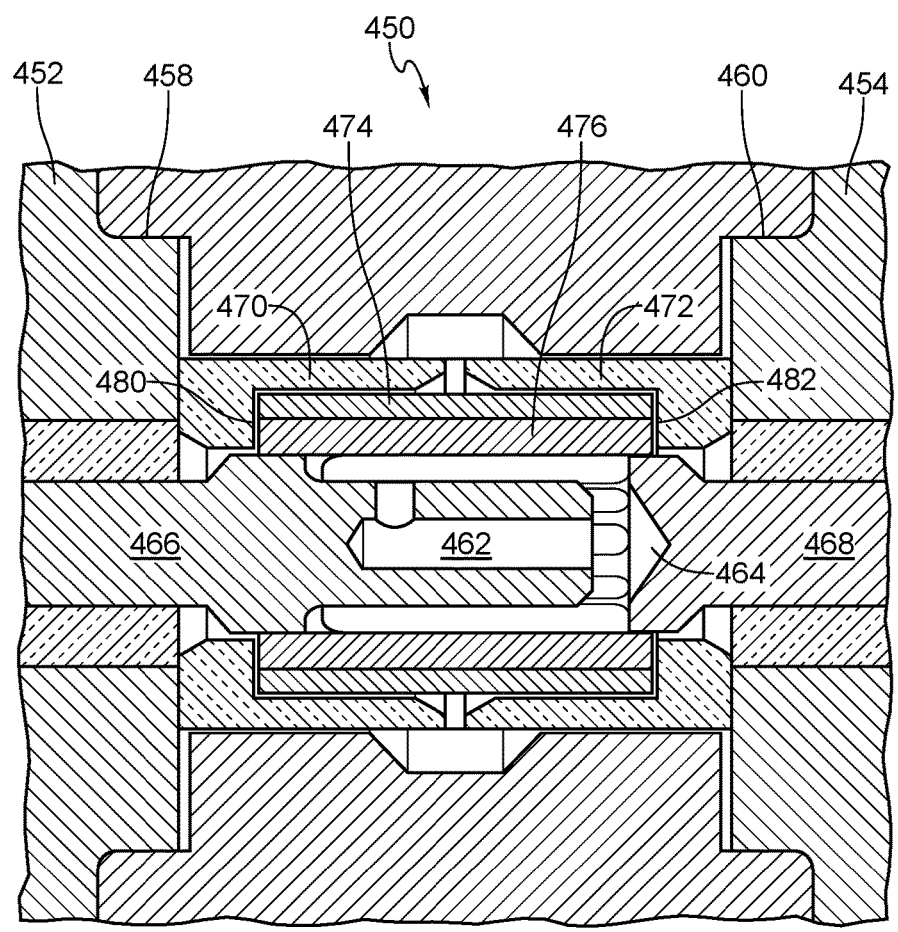

The splice connectors 300 and 350 are configured with symmetric pin connectors having male to male pin terminals. FIGS. 4A and 4B are partial cross-section and partial cutaway diagrams depicting an electrical splice connector having a male-to-female center pin interface in accordance with some embodiments. FIG. 4A depicts a splice connector 400 that includes an external connector structure comprising a first connector body 402 and a second connector body 404 that each house components including splice interface components for a respective pin connector. The external structure of splice connector 400 further includes a middle sleeve 406 axially disposed between connector bodies 402 and 404. Connector bodies 402 and 404 and middle sleeve 406 may be mechanically and materially coupled such as by weld joints that present substantially fluid resistance seams that provide a pressure barrier against external, high pressure fluids from entering the internal structure of splice connector 400.

The internal structure of splice connector 400 is disposed within respective internal cavities defined by the IDs of connector bodies 302 and 304. The internal structure includes a pair of connector receptacles 408 and 410 disposed at each end of splice connector 400. Splice connector 400 further includes a splice interface 412 configured to electrically connect the two line conductors contained in connector receptacles 408 and 410. Splice interface 412 is configured as two distinct pin connectors having respective center pins. The first pin connector includes a conductive center pin 405 that is disposed within and extends axially from connector receptacle 408. The second pin connector includes a conductive center pin 407 that is disposed within and extends axially from connector receptacle 410. In contrast to the embodiments in FIGS. 3A and 3B in which the opposing center pins had male pin terminals configured back-to-back, center pins 405 and 407 are configured to be directly coupled in a male-to-female connection. In the depicted embodiment, center pin 405 includes a male pin terminal 422 that is coupled to a female pin terminal 424 on center pin 407 within splice interface 412.

Similar to the splice interface in FIGS. 3A and 3B, splice interface 412 further includes a shrink ring 426 that is annularly disposed between a pair of shrink ring collars and the opposing pair of pin terminals 422 and 424. Shrink ring 426 may be activated by heating, causing shrink ring 426 to compress radially inward and secure the connection of the opposing pin connectors and particularly the mechanical connection between pin terminals 422 and 424. Shrink ring 426 may be fabricated of a metallic conductive material providing an additional, parallel current path between the ODs of each of center pins 405 and 407 with which the ID of shrink ring 426 is compressed into contact. In alternate embodiments, shrink ring 426 may comprise an electric insulator material such as a ceramic material. Pressure sleeve 414 is annularly disposed between an ID of an extent of connector body 402 and an OD of center pin 405. Pressure sleeve 416 is annularly disposed between an ID of an extent of connector body 404 and an OD of center pin 407. The inner and outer contours of pressure sleeves 414 and 416 substantially match the contour of the opposing surfaces of connector bodies 402 and 404 and center pins 405 and 407 to provide maximum contact joints. Similar to splice connectors 300 and 350, splice connector 400 further includes cylindrical grooves 418 and 420 within connector bodies 402 and 404, respectively, that provide a more fail-safe design in case one side of the splice connector is breached by high pressure fluid.

FIG. 4B illustrates a splice interface 450 which may be utilized in a male-to-female splice connector that includes a first connector body 452 and a second connector body 454. The external profile of splice interface 450 includes a middle sleeve 456 axially disposed between connector bodies 452 and 454. Connector bodies 452 and 454 and middle sleeve 456 may be mechanically and materially coupled such as by weld joints 458 and 460 that present substantially fluid resistance seams that provide a pressure barrier against external, high pressure fluids from entering the internal structure that includes splice interface 450. Weld joints 458 and 460 are depicted as being relatively shallow and it should be noted that the weld joint depth may be determined based, at least in part, on the fluid pressure and related stresses that the joints are designed to resist.

Splice connector 450 further includes a splice interface configured to electrically connect the two line conductors contained in connector receptacles similar to connector receptacles 408 and 410 of FIG. 4A. As shown in FIG. 4B, the splice interface is configured as two distinct pin connectors having respective center pins 466 and 468. Similar to splice interface 412 in FIG. 4A, center pins 466 and 468 are configured to be directly coupled in a male-to-female connection. In the depicted embodiment, center pin 466 includes a male pin terminal 462 that is coupled to a female pin terminal 464 on center pin 468. Splice interface 450 further includes a shrink ring assembly comprising a shrink ring 474 and a conductive sleeve 476 with shrink ring 474 annularly disposed between a pair of shrink ring collars 470 and 472 and conductive sleeve 476. As shown, conductive sleeve 476 is annular disposed between shrink ring 474 and the opposing pair of pin terminals 462 and 464. Shrink ring 474 may be activated by heating, causing shrink ring 474 and conductive sleeve 476 to compress radially inward and secure the connection of the opposing pin connectors and particularly the mechanical connection between pin terminals 462 and 464. In the depicted embodiment, shrink ring 474 may be fabricated of a conductive or insulator material and conductive sleeve 476 provides a parallel current path between the ODs of each of center pins 466 and 468 with which the ID of conductive sleeve 476 is compressed into contact. The parallel current path provided by the configuration of conductive sleeve 476 results in a more electrically efficient electrical connection and allows the connection to accommodate higher current and power levels. To prevent an electric short from either of center pins 466 or 468 with other metallic components, shrink ring collars 470 and 472 may be fabricated of an electrical insulating material such as a PEEK material. Splice interface 450 further includes seams 480 and 482 between shrink ring 474 and conductive sleeve 476 and shrink ring collars 470 and 472 which may or may not be filled with a non-conductive material such as an epoxy. In some embodiments for example in which shrink ring collars 470 and 472 are not fabricated of an electrical insulating material, seams 480 and 482 may comprise an insulation material such as PEEK material.

Variations

While the aspects of the disclosure are described with reference to various implementations and exploitations, it will be understood that these aspects are illustrative and that the scope of the claims is not limited to them. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. Use of the phrase "at least one of" preceding a list with the conjunction "and" should not be treated as an exclusive list and should not be construed as a list of categories with one item from each category, unless specifically stated otherwise.

Embodiment 1: A downhole splice connector comprising: at least one connector body having an inner diameter defining a cavity within which at least one connector receptacle is disposed; at least one conductive center pin disposed within the at least one connector receptacle; and at least one pressure sleeve annularly disposed between an inner diameter of the connector body and an outer diameter of the center pin, such that a pressure barrier is formed between an outer diameter of the pressure sleeve and an inner diameter of the connector body and a pressure barrier is formed between an inner diameter of the pressure sleeve and an outer diameter of the center pin. The pressure sleeve may comprise a polycrystalline or amorphous material having at least one of a crystalline region and an amorphous region. The pressure sleeve may comprise a ceramic glass sleeve and the pressure barriers may include: a glass-to-metal joint between the outer diameter of the pressure sleeve and the inner diameter of the connector body; and a glass-to-metal joint between the inner diameter of the pressure sleeve and the outer diameter of the center pin. The connector body may comprise an integrated body, and the at least one connector receptacle may comprise a pair of opposing connector receptacles within which opposing ends of the center pin are disposed, and the pressure sleeve may be disposed axially between the pair of opposing connector receptacles. The downhole splice connector may further comprise a cylindrical groove extending from an axial end of the at least one connector receptacle and disposed concentrically around an axial extent of a cylindrical extent of the connector body that is annularly disposed between the cylindrical groove and an extent of the at least one pressure sleeve. The at least one connector body may include a first connector body, a second connector body, and a middle sleeve disposed axially between the first connector body and the second connector body. The downhole splice connector may further comprise: a first pin connector that includes, the first connector body having a first cavity; a first connector receptacle disposed within the first cavity; and a first center pin disposed within the first connector receptacle; and a second pin connector that includes, the second connector body having a second cavity; a second connector receptacle disposed within the second cavity; and a second center pin disposed within the second connector receptacle. The first pin connector may include a first pin terminal coupled to a distal end of the first center pin, and wherein the second pin connector includes a second pin terminal coupled to a distal end of the second center pin and disposed in opposing proximity to the first pin terminal, said splice connector further comprising a shrink ring disposed concentrically around the first and second pin terminals. The at least one pressure sleeve may include a first pressure sleeve, the first pin connector including the first pressure sleeve annularly disposed between an inner diameter of the first connector body and an outer diameter of the first center pin, such that a pressure barrier is formed between an outer diameter of the first pressure sleeve and an inner diameter of the first connector body and a pressure seal is formed between an inner diameter of the first pressure sleeve and an outer diameter of the first center pin. The at least one pressure sleeve may include a second pressure sleeve with the second pin connector including the second pressure sleeve annularly disposed between an inner diameter of the second connector body and an outer diameter of the second center pin, such that a pressure barrier is formed between an outer diameter of the second pressure sleeve and an inner diameter of the second connector body and a pressure seal is formed between an inner diameter of the second pressure sleeve and an outer diameter of the second center pin.

Embodiment 2: A splice connector comprising: a first pin connector including, a first connector body having a first cavity; a first connector receptacle disposed within the first cavity; a first center pin disposed within the first connector receptacle; and a first glass sleeve annularly disposed between an inner diameter of the first connector body and an outer diameter of the first center pin, such that a pressure barrier is formed between an outer diameter of the first glass sleeve and an inner diameter of the first connector body and a pressure seal is formed between an inner diameter of the first glass sleeve and an outer diameter of the first center pin; and a second pin connector including, a second connector body having a second cavity; a second connector receptacle disposed within the second cavity; a second center pin disposed within the second connector receptacle; and a second glass sleeve annularly disposed between an inner diameter of the second connector body and an outer diameter of the second center pin, such that a pressure barrier is formed between an outer diameter of the second glass sleeve and an inner diameter of the second connector body and a pressure barrier is formed between an inner diameter of the second glass sleeve and an outer diameter of the second center pin. The first pin connector may include a first pin terminal coupled to a distal end of the first center pin, and wherein the second pin connector includes a second pin terminal coupled to a distal end of the second center pin and disposed in opposing proximity to the first pin terminal, said splice connector further comprising a shrink ring disposed concentrically around the first and second pin terminals. The splice connector may further comprise a splice interface comprising a middle sleeve disposed axially between the first connector body and the second connector body and disposed concentrically around the shrink ring, wherein the middle sleeve includes axial ends that are weld or adhesive bonded to opposing axial ends of the first and second connector body. The glass sleeve may comprise a ceramic glass sleeve. The pressure barriers may include: a glass-to-metal joint between the outer diameter of the first glass sleeve and the inner diameter of the first connector body; a glass-to-metal joint between the inner diameter of the first glass sleeve and the outer diameter of the first center pin; a glass-to-metal joint between the outer diameter of the second glass sleeve and the inner diameter of the second connector body; and a glass-to-metal joint between the inner diameter of the second glass sleeve and the outer diameter of the second center pin. The splice connector may further comprise a flange groove extending from an axial end of at least one of the first and second connector receptacles and disposed concentrically around an axial extent of at least one of the first and second glass sleeves.

Embodiment 3: A downhole electrical connection apparatus comprising: an electric line disposed within a wellbore; and a splice connection that couples a first segment of the electric line to a second segment of the electric line, said splice connection including, at least one connector body having an inner diameter defining a cavity within which at least one connector receptacle is disposed; at least one conductive center pin disposed within the at least one connector receptacle; and at least one pressure sleeve annularly disposed between an inner diameter of the connector body and an outer diameter of the center pin, such that a pressure barrier is formed between an outer diameter of the pressure sleeve and an inner diameter of the connector body and a pressure barrier is formed between an inner diameter of the pressure sleeve and an outer diameter of the center pin. The pressure sleeve may comprise a ceramic glass sleeve and the pressure barriers may include: a glass-to-metal joint between the outer diameter of the pressure sleeve and the inner diameter of the connector body; and a glass-to-metal joint between the inner diameter of the pressure sleeve and the outer diameter of the center pin. The at least one connector body may include a first connector body, a second connector body, and a middle sleeve disposed axially between the first connector body and the second connector body. The at least one pressure sleeve may include a first glass sleeve and a second glass sleeve, and said downhole electrical connection apparatus may further comprise: a first pin connector that includes, the first connector body having a first cavity; a first connector receptacle disposed within the first cavity; a first center pin disposed within the first connector receptacle; and the first glass sleeve annularly disposed between an inner diameter of the first connector body and an outer diameter of the first center pin, such that a pressure barrier is formed between an outer diameter of the first glass sleeve and an inner diameter of the first connector body and a pressure seal is formed between an inner diameter of the first glass sleeve and an outer diameter of the first center pin; a second pin connector that includes, the second connector body having a second cavity; a second connector receptacle disposed within the second cavity; a second center pin disposed within the second connector receptacle; and the second glass sleeve annularly disposed between an inner diameter of the second connector body and an outer diameter of the second center pin, such that a pressure barrier is formed between an outer diameter of the second glass sleeve and an inner diameter of the second connector body and a pressure barrier is formed between an inner diameter of the second glass sleeve and an outer diameter of the second center pin.

What is claimed is:

1. A downhole splice connector comprising:
a first connector body having a first connector sleeve defining a first cavity, the first cavity extending from a first connector receptacle positioned within the first connector body to a first weld joint;
a second connector body having a second connector sleeve defining a second cavity, the second cavity extending from a second receptacle positioned within the second connector body to a second weld joint,
a splice interface axially disposed between and physically coupling the first connector body with the second connector body, the splice interface comprising a middle sleeve having a first end coupled to the first connector body at the first weld joint and having a second end coupled to the second connector body at the second weld joint,
a conductive center pin disposed within and extending axially through the splice interface, the conductive center pin having a first pin end extending into the first cavity of the first connector sleeve and a second pin end extending into the second cavity of the second connector sleeve; and
a pressure sleeve annularly disposed between an inner diameter of the splice interface and an outer diameter of the conductive center pin, such that a pressure barrier is formed between the first cavity of the first connector body and the second cavity of the second connector body.

2. The downhole splice connector of claim 1, wherein the pressure sleeve comprises a polycrystalline or amorphous material having at least one of a crystalline region and an amorphous region.

3. The downhole splice connector of claim 1, wherein the pressure sleeve comprises a ceramic glass sleeve and the pressure barrier includes:
a first glass-to-metal joint formed between the outer diameter of the pressure sleeve and an inner diameter of the splice interface; and
a second glass-to-metal joint formed between an inner diameter of the pressure sleeve and the outer diameter of the conductive center pin.

4. The downhole splice connector of claim 1,
wherein the first connector body includes a first end coupler configured to mechanically fasten to a first coupling of a first line conductor to be coupled to the first connector body; and
wherein the second connector body includes a second end coupler configured to mechanically fasten to a second coupling of a second line conductor to be coupled to the second connector body.

5. The downhole splice connector of claim 1, wherein the first connector body, the second connector body, and the splice interface comprise a steel alloy material.

6. The downhole splice connector of claim 1, wherein the pressure sleeve is formed from an electrically insulative material and is configured to electrically insulate the conductive center pin from the middle sleeve.

7. The downhole splice connector of claim 1, further comprising:
a first cylindrical groove disposed around a first end of the pressure sleeve proximate an inner axial end of the first connector sleeve; and
a second cylindrical groove disposed around a second end of the pressure sleeve proximate an inner axial end of the second connector sleeve.

8. The downhole splice connector of claim 1, wherein the conductive center pin is formed from an electrically conductive material comprising copper or a copper alloy, stainless steel, or a nickel alloy.

9. A downhole splice connector comprising:
a first connector body having a first connector sleeve defining a first cavity, the first cavity extending from a first connector receptacle disposed within the first connector body to a first weld joint;
a second connector body having a second connector sleeve defining a second cavity, the second cavity extending from a second connector receptacle disposed within the second connector body to a second weld joint;
a middle sleeve axially disposed between and physically coupling the first connector body with the second connector body, the middle sleeve having a first end coupled to the first connector body at the first weld joint and a second end coupled to the second connector body at the second weld joint;
a first conductive pin partially disposed within the first connector body and partially disposed with the middle sleeve, the first conductive pin having a first pin receptacle end at one end of the first conductive pin and a first pin terminal end at an opposite end of the first conductive pin, wherein the first pin receptacle end is disposed within the first cavity and the first pin terminal end is disposed within the middle sleeve;
a second conductive pin partially disposed within the second connector body and partially disposed with the middle sleeve, the second conductive pin having a second pin receptacle end at one end of the second conductive pin and a second pin terminal end at an opposite end of the second conductive pin, wherein the second pin receptacle end is disposed within the second cavity and the second pin terminal end is disposed within the middle sleeve; and
a shrink ring comprising a conductive material, disposed within the middle sleeve, and annually disposed at the first pin terminal end of the first conductive pin and at the second pin terminal end of the second conductive pin, thereby forming an electrically conductive path between the first conductive pin and the second conductive pin.

10. The downhole splice connector of claim 9, further comprising:
a first pressure sleeve annularly disposed between an inner diameter of the first connector body and an outer diameter of the first conductive pin, such that a first pressure barrier is formed between an outer diameter of the first pressure sleeve and an inner diameter of the first connector body, and a seconds pressure seal is formed between an inner diameter of the first pressure sleeve and an outer diameter of the first conductive pin; and
a second pressure sleeve annularly disposed between an inner diameter of the second connector body and an outer diameter of the second conductive pin, such that a third pressure barrier is formed between an outer diameter of the second pressure sleeve and the inner diameter of the second connector body, and a fourth pressure barrier is formed between an inner diameter of the second pressure sleeve and an outer diameter of the second conductive pin.

11. The downhole splice connector of claim 10, wherein the first pressure sleeve and the second pressure sleeve comprise a ceramic glass.

12. The downhole splice connector of claim 10, further comprising:
a first cylindrical groove extending from an axial end of the first connector receptacle proximate the first weld joint, the first cylindrical groove disposed concentrically around at least a portion of the first pressure sleeve; and
a second cylindrical groove extending from an axial end of the second connector receptacle proximate the second weld joint, the second cylindrical groove disposed concentrically around at least a portion of the second pressure sleeve.

13. The downhole splice connector of claim 9, wherein the shrink ring is disposed between a pair of shrink ring collars and opposing portions of the first pin terminal end of the first conductive pin and the second pin terminal end of the second conductive pin.

14. The downhole splice connector of claim 13, further comprising an outer shrink ring disposed between the pair of shrink ring collars and the shrink ring.

15. The downhole splice connector of claim 9, wherein the first pin terminal end of the first conductive pin and the second pin terminal end of the second conductive pin are directly coupled in a male-to-female connection.

16. A downhole electrical connection apparatus comprising:
an electric line disposed within a wellbore; and
a splice connection that electrically and physically couples a first segment of the electric line to a second segment of the electric line, said splice connection comprising:
a first connector body having a first connector sleeve defining a first cavity, the first cavity extending from a first connector receptacle disposed within the first connector body to a first weld joint;
a second connector body having a second connector sleeve defining a second cavity, the second cavity extending from a second connector receptacle disposed within the second connector body to a second weld joint;
a middle sleeve axially disposed between and physically coupling the first connector body with the second connector body, the middle sleeve having a first end coupled to the first connector body at the first weld joint and a second end coupled to the second connector body at the second weld joint;
a first conductive pin partially disposed within the first connector body and partially disposed with the middle sleeve, the first conductive pin having a first pin receptacle end at one end of the first conductive pin and a first pin terminal end at an opposite end of the first conductive pin, wherein the first pin receptacle end is disposed within the first cavity and the first pin terminal end is disposed within the middle sleeve;
a second conductive pin partially disposed within the second connector body and partially disposed with the middle sleeve, the second conductive pin having a second pin receptacle end at one end of the second conductive pin and a second pin terminal end at an opposite end of the second conductive pin, wherein the second pin receptacle end is disposed within the second cavity and the second pin terminal end is disposed within the middle sleeve; and
a shrink ring comprising a conductive material, disposed within the middle sleeve, and annually disposed at the first pin terminal end of the first conductive pin and at the second pin terminal end of the second conductive pin, thereby forming an electrically conductive path between the first conductive pin and the second conductive pin.

17. The downhole electrical connection apparatus of claim 16, further comprising:
a first pressure sleeve annularly disposed between an inner diameter of the first connector body and an outer diameter of the first conductive pin, such that a first pressure barrier is formed between an outer diameter of the first pressure sleeve and an inner diameter of the first connector body, and a seconds pressure seal is formed between an inner diameter of the first pressure sleeve and an outer diameter of the first conductive pin; and
a second pressure sleeve annularly disposed between an inner diameter of the second connector body and an outer diameter of the second conductive pin, such that a third pressure barrier is formed between an outer diameter of the second pressure sleeve and the inner diameter of the second connector body, and a fourth pressure barrier is formed between an inner diameter of the second pressure sleeve and an outer diameter of the second conductive pin.

18. The downhole electrical connection apparatus of claim 16, wherein the shrink ring is disposed between a pair of shrink ring collars and opposing portions comprising the first pin terminal end of the first conductive pin and the second pin terminal end of the second conductive pin.

19. The downhole electrical connection apparatus of claim 16, wherein the first pin terminal end of the first conductive pin and the second pin terminal end of the second conductive pin are directly coupled in a male-to-female connection.

20. The downhole electrical connection apparatus of claim 16, further comprising:
a first seal groove and a first weld flange extending axially around an outer surface of the first connector body; and
a second seal groove and a second weld flange extending axially around an outer surface of the second connector body.

* * * * *